US011735124B2

(12) United States Patent
Park et al.

(10) Patent No.: US 11,735,124 B2
(45) Date of Patent: Aug. 22, 2023

(54) LIGHT SOURCE EMBEDDED REFLECTIVE DISPLAY

(71) Applicant: GM GLOBAL TECHNOLOGY OPERATIONS LLC, Detroit, MI (US)

(72) Inventors: Jonglee Park, Troy, MI (US); Susan Carol Ellis, Enniskillen (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/540,956

(22) Filed: Dec. 2, 2021

(65) Prior Publication Data

US 2023/0178038 A1 Jun. 8, 2023

(51) Int. Cl.

| | |
|---|---|
| ***G09G 3/34*** | (2006.01) |
| ***G02F 1/1677*** | (2019.01) |
| ***G09G 3/32*** | (2016.01) |
| ***G02F 1/167*** | (2019.01) |

(52) U.S. Cl.

CPC ........... *G09G 3/3406* (2013.01); *G02F 1/167* (2013.01); *G02F 1/1677* (2019.01); *G09G 3/32* (2013.01); *G09G 2360/144* (2013.01); *G09G 2380/10* (2013.01)

(58) Field of Classification Search

CPC .. G09G 3/3406; G09G 3/32; G09G 2360/144; G09G 2380/10; G09G 3/344; G09G 3/3473; G02F 1/167; G02F 1/1677

See application file for complete search history.

(56) References Cited

U.S. PATENT DOCUMENTS

| | | | | |
|---|---|---|---|---|
| 9,530,381 | B1 * | 12/2016 | Bozarth | H05B 47/00 |
| 10,627,694 | B1 * | 4/2020 | Wang | G09G 3/3208 |
| 2014/0160137 | A1 * | 6/2014 | Martin | G06F 12/00 359/291 |
| 2016/0154170 | A1 * | 6/2016 | Thompson | G02B 6/0073 362/555 |
| 2017/0301273 | A1 * | 10/2017 | Atkinson | G09G 3/344 |
| 2018/0210118 | A1 * | 7/2018 | Collier | G02F 1/133524 |
| 2020/0185453 | A1 * | 6/2020 | Cho | H01L 33/44 |
| 2020/0393734 | A1 * | 12/2020 | Li | G09G 3/344 |
| 2021/0114462 | A1 * | 4/2021 | De Castro Turner | B60K 35/00 |

* cited by examiner

*Primary Examiner* — Antonio Xavier

(74) *Attorney, Agent, or Firm* — Cantor Colburn LLP

(57) ABSTRACT

A reflective display device includes a layer of pigment material that is divided into a plurality of pixels, the pigment material in each pixel displaying information by reflecting light. The reflective display device further includes a light source embedded in the layer of a pigment material, wherein the light source emits light that is reflected by the pigment material.

13 Claims, 8 Drawing Sheets

LIGHT SOURCE EMBEDDED REFLECTIVE DISPLAY

INTRODUCTION

The subject disclosure relates to reflective display systems, particularly reflective display systems with an embedded light source.

As vehicle manufacturers progress in vehicle designs, new and innovative looks are desirable for vehicle information displays. In the area of information displays, design goals include providing information displays that are easier to read, less costly, less bulky, less heavy, consume less energy and are more flexible for various applications and ambient lighting conditions. Obtaining some or all of these goals opens the door for possible innovative design of improved display panels.

SUMMARY

According to one or more aspects, a reflective display device includes a layer of pigment material that is divided into a plurality of pixels, the pigment material in each pixel displaying information by reflecting light. The reflective display device further includes a light source embedded in the layer of a pigment material, wherein the light source emits light that is reflected by the pigment material.

In one or more aspects, the reflective display device further includes a transparent sealing between a pixel and the light source.

In one or more aspects, the reflective display device further includes a layer of reflective material to reflect the light emitted by the light source to one or more pixels from the plurality of pixels.

In one or more aspects, the light source is a plurality of light sources.

In one or more aspects, the light source is a microLED.

In one or more aspects, the reflective display device further includes a light sensor that detects an amount of ambient light, wherein the light source emits the light in response to the amount of ambient light is below a predetermined threshold.

In one or more aspects, the reflective display device further includes a substrate layer that supports the layer of pigment material.

According to one or more aspects, a method includes determining, using a light sensor, that an amount of ambient light surrounding a reflective display panel. The method further includes, based on determining that the ambient light is below a predetermined threshold, causing a light source to emit light that is incident on a pigment material in a pixel of the reflective display panel by providing electric power to the light source, the light source is embedded in the reflective display panel in the layer as the pixel.

In one or more aspects, the light source is a microLED.

In one or more aspects, the reflective display panel comprises a layer of reflective material embedded under the light source, wherein the emitted light from the light source is directed by the layer of reflective material to the pixel.

In one or more aspects, the light source is separated from the pixel by a transparent sealing material, the emitted light from the light source passes through the transparent sealing material.

In one or more aspects, the pigment material in the pixel displays information by reflecting light.

In one or more aspects, the emitted light from the light source is proportional to the amount of ambient light.

In one or more aspects, the light source is embedded in the same layer as the pixel.

According to one or more aspects, a vehicle includes a reflective display device that includes a layer of pigment material that is divided into a plurality of pixels, the pigment material in each pixel displaying information by reflecting light. The reflective display device further includes a light source embedded in the layer of pigment material, wherein the light source emits light that is reflected by the pigment material.

In one or more aspects, the reflective display device further includes a transparent sealing between a pixel and the light source.

In one or more aspects, the reflective display device further includes a layer of reflective material to reflect the light emitted by the light source to one or more pixels from the plurality of pixels.

In one or more aspects, the light source is a plurality of light sources.

In one or more aspects, the light source is a microLED.

In one or more aspects, the reflective display device further includes a light sensor that detects an amount of ambient light, wherein the light source emits the light in response to the amount of ambient light being below a predetermined threshold.

The above features and advantages and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which:

FIG. 7 depicts an example structure of using the reflective information display panel as part of a transparent display in a vehicle according to one or more examples.

DETAILED DESCRIPTION

Figure 1A:
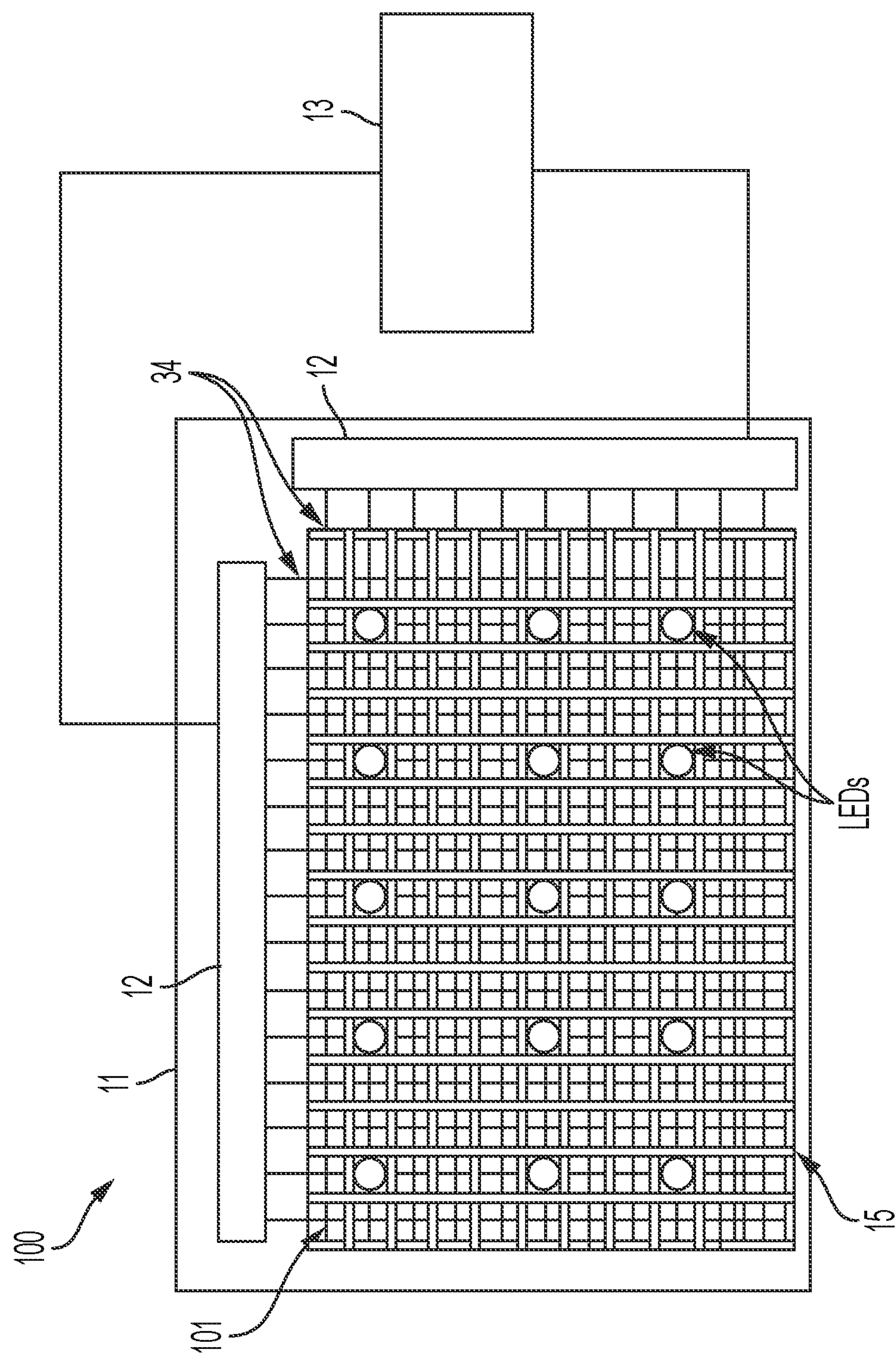
FIG. 1A shows a top view of a reflective display panel according to one or more aspects.

The following description is merely exemplary in nature and is not intended to limit the present disclosure, its application, or uses. It should be understood that throughout the drawings, corresponding reference numerals indicate like or corresponding parts and features. As used herein, the term module refers to processing circuitry that may include an application-specific integrated circuit (ASIC), an electronic circuit, a processor (shared, dedicated, or group) and memory that executes one or more software or firmware programs, a combinational logic circuit, and/or other suitable components that provide the described functionality.

It should be noted that although one or more aspects of display panels, particularly reflective display panels, are discussed in the context of an automotive vehicle, such as a car, a truck, a bus, a boat, a motor-bike, etc. the technical solutions described herein are applicable in other fields of application where display panels are used. Accordingly, technical solutions described herein are not to be limited to any particular field of application, and they provide practical application to a technical challenge in several fields of application.

The technical solutions described herein address technical challenges with display panels, and particularly reflective display panels that are based on technology that reflects ambient light from electric pigments rather than emitting/self-generating light. Such reflective display panels facilitate displays that can be read as easily as paper in the presence of ambient light, for example, sunlight, for a more natural viewing experience. However, it can be challenging to read the information on such displays under low ambient lighting conditions (e.g., in evenings/nights, in darker rooms, etc.). Here, a "low ambient lighting condition" is when the ambient light surrounding a display panel is below a predetermined threshold (e.g., 200 Lux, 100 Lux, etc.).

The conventional way to overcome such technical challenges is to install an additional lighting system to illuminate the display externally. However, the display requires additional components for the lighting system that makes the display bulkier (compared to without the external lighting). Such bulkier displays are not suitable for several applications, for example, smart glass applications in vehicles. Smart glass applications facilitate a window panel, a windshield, or any other panel in a vehicle to be used as a display panel. In some cases, the display panel may be user-interactive, such as a touchscreen.

The technical solutions described herein facilitate making the reflective display readable under low environmental light conditions. In one or more aspects of the present technical solutions, a lighting system is embedded with a microLED into the display panel. In one or more aspects, the microLED is embedded on the same layer as the electronic pigment material that is used to form the individual pixel elements. Further, in one or more aspects, by installing a reflective layer below the microLED or transmittance sealing material to secure the electric pigments on the designated area, the efficiency of the lighting system can be increased to reduce power consumption or decrease the number of microLEDs to be embedded. Further yet, in one or more aspects, lighting sensors are also embedded in the display panel, for example, on the same layer, to monitor the ambient light condition and control the light output from microLEDs depending on environmental lighting conditions.

A micro light-emitting diode (microLED), sometimes also referred to as micro-LED, mLED, or μLED, is a microscopic light-emitting diode (LED) of a size of less than 50 micrometers.

In accordance with an exemplary embodiment, FIG. 1A shows a top or plan view illustrated of a reflective display panel 100 according to one or more aspects of the technical solutions described herein. FIG. 2 shows a side or sectional view illustrated of the reflective display panel 100 of FIG. 1A. It is understood that the number of components and dimensions shown in the figures herein are illustrative and that in one or more aspects of the present technical solutions, the number of components and dimensions can vary.

The reflective display panel 100 may include a substrate 11 for supporting a pixel frame 15 that includes a plurality of pigments that form individual pixel elements. The substrate 11 may be preferably made of an insulating material (e.g., glass or Acrylic) or other materials suitable for supporting the pixel frame 15. The pixel frame 15 encompasses a display area of the display panel (i.e., where an image is rendered by the display panel 100).

The surface of substrate 11 is divided into multiple sub-regions 101. It is noted that the divided sub-regions 101 are not physically cut through, and the substrate 11 is not made by integrating the sub-regions 101. In other words, substrate 11 is a single or whole entity or an uncut entity. Further, it should be noted that the division of substrate 11 in FIG. 1A is illustrative, and that in one or more examples, the display panel 100 is divided in a different manner (number of sub-regions 101, dimensions, etc.) depending on the resolution of the sub-regions 101 and the display panel 100.

The display panel 100 may include several drivers 12, which are correspondingly disposed relative to (e.g., top, left, right, etc.) the sub-regions 101, respectively. It should be noted that the positions of drivers 12 are exemplified in FIG. 1A, however, drivers 12 may be disposed of in any other positions in other examples. Typically, a driver 12 is placed outside of the display area, which is encompassed by the sub-regions 101 that comprise the pixels of the display panel. A driver 12 may be an integrated circuit or chip, which is then bonded on the surface of the substrate 11. In some examples, driver 12 is mounted using surface-mount technology (SMT) such as chip-on-glass (COG) or flip chip. Drivers 12 can include a scan line driver and a data line driver for the rows and columns, respectively.

Figure 2A:
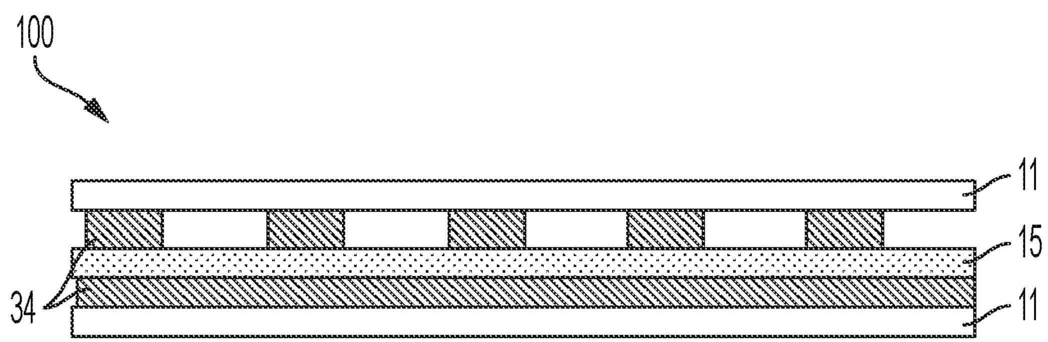
FIG. 2A and FIG. 2B show a side view of a reflective display panel according to one or more aspects.
Figure 2B:
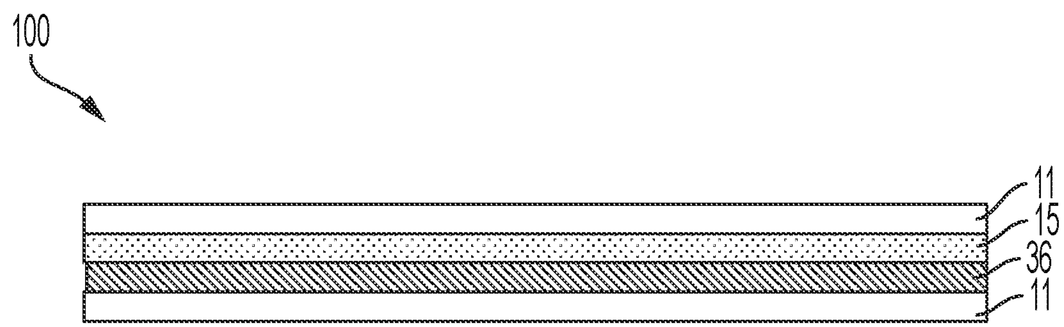

Drivers 12 can drive the pixels of the display panel 100 using either passive or active matrix. FIG. 2A shows a side/sectional view of a passive matrix display and FIG. 2B shows a side/sectional view of an active matrix display. In some aspects, the electrical signal is applied to pixels 30 using electrodes 34 to control the image rendered. In some examples, the display panel 100 includes a thin film transistor (TFT) layer 36, FIG. 2B, to control the display image (i.e., content) shown by the pixels 30.

The display panel 100 further includes one or more timing controllers (TCON) 13, which are electrically connected with the substrate 11. In some examples, a TCON 13 may be connected to substrate 11 via a flexible printed circuit board (FPCB). The TCON 13 can further be electrically connected with corresponding drivers 12, for example, via signal traces (not shown) disposed on the substrate 11. In some examples, one TCON 13 may be electrically connected with at least two drivers 12. Accordingly, the number of the TCONs 13 may be less than the number of the drivers 12. The TCON 13 may be electrically connected directly with corresponding drivers 12 via signal traces. Alternatively, the TCON 13 may be electrically connected to one driver 12 via signal traces and, after signal buffering, then be electrically connected to another driver 12 via signal traces.

In some aspects, drivers 12, the pixel frame 15, and other components are embedded between two layers of the substrate 11, FIG. 2A. In some examples, a first substrate layer and a second substrate layer can use different substrate materials. For example, a layer may be a non-transparent material that supports the components (e.g., drivers, the pixel frame, etc.), and a layer may be made of a transparent material that facilitates the ambient light to activate the pigments forming the pixels and also facilitates a user to see the pixels (and hence content displayed).

Figure 1B:
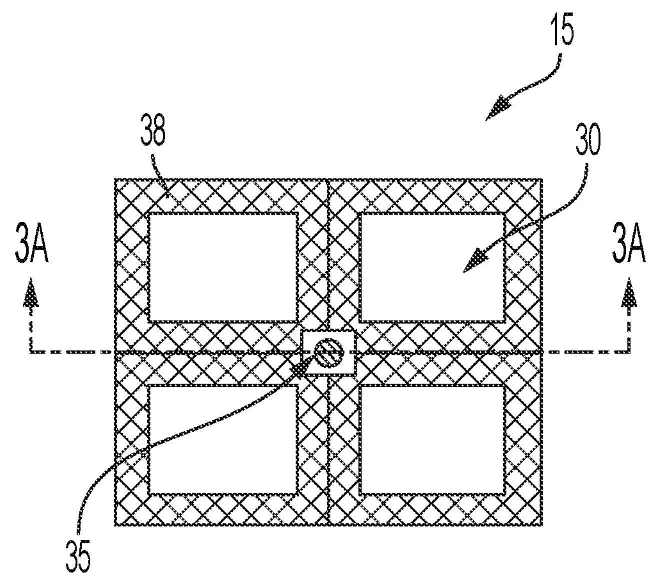
FIG. 1B, FIG. 1C, and FIG. 1D depict one or more pixel frames according to one or more aspects.
Figure 1C:
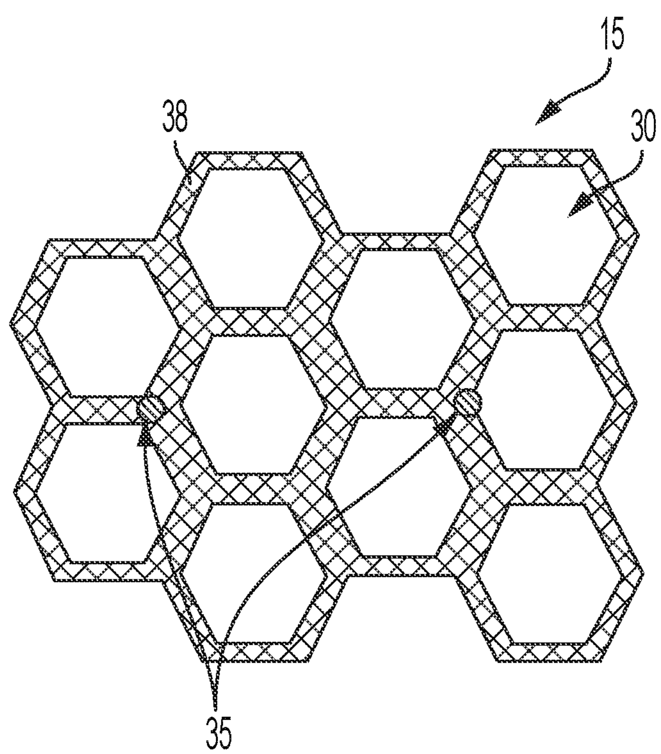
Figure 1D:
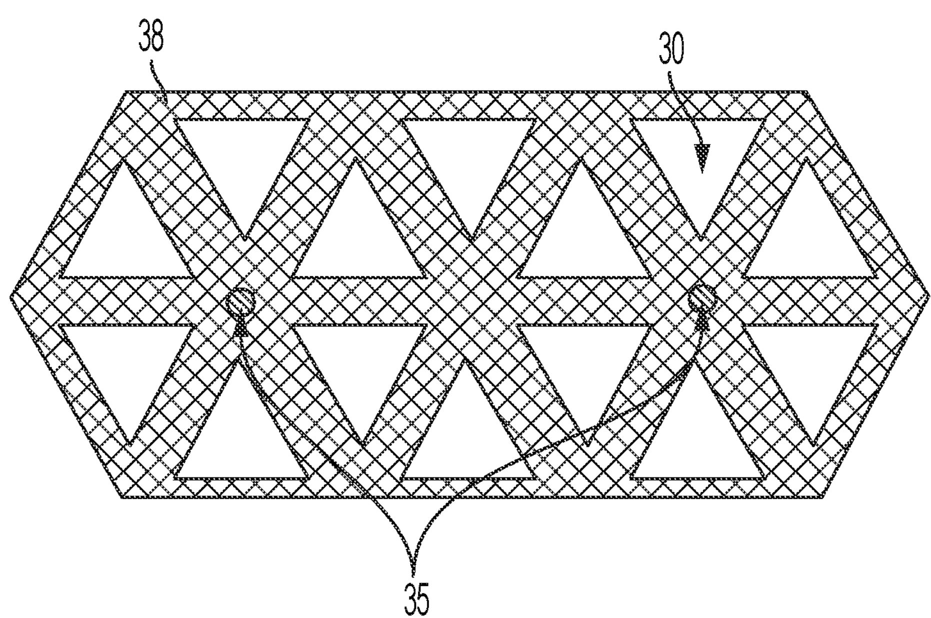

In one or more aspects, in FIGS. 1B, 1C, and 1D, pixel frame 15 uses a transparent sealing 38 to separate one pixel from another. Further, pixel frame 15 includes one or more light sources 35, such as an LED. FIGS. 1B, 1C, and 1D depict several examples of pixel frames 15 with different shaped pixels 30 with the light sources 35 embedded in relation to the pixels 30. It is understood that other types of arrangements and shapes are possible in other examples.

Figure 3A:
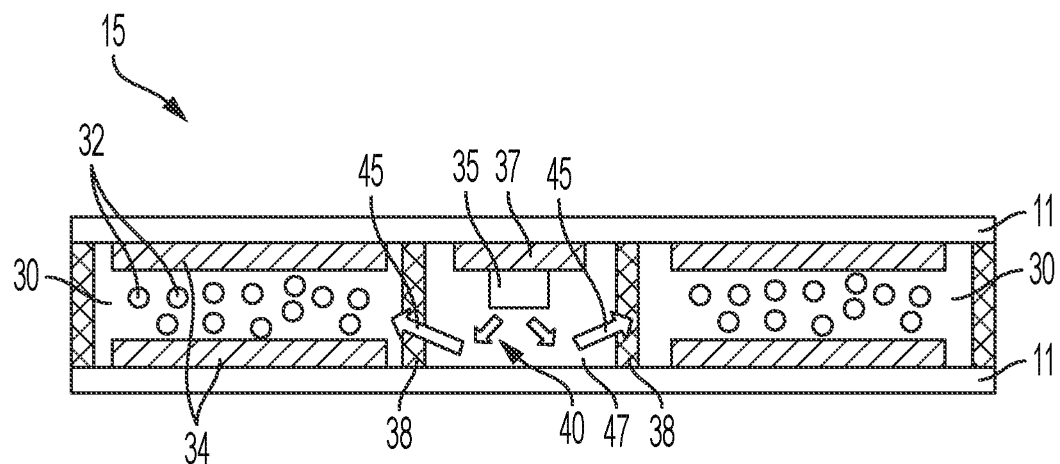
FIG. 3A, FIG. 3B, and FIG. 3C depict side views of a pixel frame according to one or more aspects of the present technical solutions.

FIG. 3A depicts a pixel frame 15 according to one or more aspects of the present technical solutions. The pixel frame 15 includes one or more pixels 30. It is understood that only two pixels 30 are depicted for illustration. However, in one or more aspects, the pixel frame 15 can include several more pixels 30. The number of pixels 30 in the pixel frame 15 depends on the resolution of the display panel 100.

Each pixel 30 includes reflective material 32, such as pigments and/or dyes. The intended color and image can be presented at each pixel 30 by controlling an electrical signal at each pixel 30. Drivers 12, FIG. 1, can control the electrical signal to each pixel 30 based on signals from TCONs 13. In some aspects, the electrical signal is applied to the reflective material 32 using electrodes 34.

The type of reflective material 32 can vary from one aspect to another without affecting the technical solutions provided herein. For example, the reflective material 32 can be electrophoretic material, such as Titanium dioxide (TiO2), in which the color and brightness of each pixel 30 are controlled by moving charged pigment particles of pixel 30. Alternatively, the reflective material 32 can include water, colored oil, and an electrode coated with a hydrophobic insulator to provide an electrowetting display. In electrowetting, with no voltage, the dyed oil in pixel 30 covers the entire pixel area and shows its color, and when the voltage is turned on, the colored area decreases to expose the background because the oil forms a drop. In yet other aspects, the reflective material 32 includes electrochromic materials with electrolyte layers and electrodes for redox reactions. In this case, pixel 30 operates using electrochromic properties of the reflective material 32, where the visible color changes due to electrochemical reactions. It is understood that the above are just some examples of the reflective material 32 that can be used for pixel 30 to display content and that in other examples, different types of reflective material or combinations thereof can be used without limiting the technical solutions provided herein.

In one or more aspects, pixel 30 can include additional components that are not shown.

The pixel frame 15 further includes a light-section 40. The light-section 40 includes a microLED 35 that illuminates one or more pixels 30 in the display 100. The light-section 40 further includes at least one electrode 37 that provides electrical signals to the microLED 35.

The electrical signals facilitate the operation of the microLED 35. Operating the microLED 35 includes turning the microLED on or off. Operating the microLED 35 can further include adjusting the brightness, color, and other attributes of the microLED 35. The microLED 35 emits light 45 that facilitates the reflective material 32 of the pixels 30 to display the content to a user.

Figure 3B:
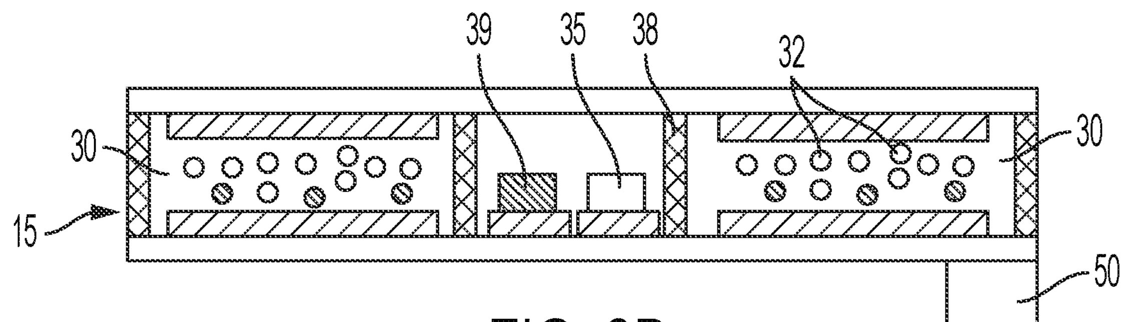

The microLED 35 can be operated in conditions of low ambient light to facilitate the pixels 30 to be visible even when the ambient light fades below the predetermined threshold. In one or more aspects, as shown in FIG. 3B, a light sensor 39 is used to detect the ambient light. The light sensor 39 can indicate whether the ambient light is below the predetermined threshold. Alternatively, or in addition, a controller 50 receives the light measurement from the light sensor 39 and determines whether the ambient light is below the predetermined threshold. In some aspects, the light sensor 39, or the controller 50, can determine the required intensity of the light 45 to be emitted by the microLED 35 based on the measured intensity of the ambient light. In response, the microLED 35 receives a corresponding electrical signal that causes the light 45 of the determined intensity. The determined intensity enables pixel 30 to be visible in the measured ambient light.

In one or more aspects, the light sensor 39 is embedded in the same layer as the microLED 35. It should be noted that the light sensor 39 may be positioned differently from what is shown in FIG. 3A. The light sensor 39 may be shared by one or more pixels 30 in some aspects. In some aspects, each pixel frame 15 can have a common light sensor 39. In some aspects, each pixel 30 has a respective light sensor 39. Other combinations of the light sensor 39 being shared by one or more pixels 30 in the display panel 100 can be possible in other aspects.

In some aspects, as shown in FIG. 3A, the light-section 40 is between two pixels 30. The light 45 emitted from the microLED 35 of the light-section 40 illuminates at least the two adjacent pixels 30. However, it is understood that the position of the light-section 40 may be different from what is depicted in FIG. 3A in other aspects. For example, light-section 40 may be shared by more than two pixels 30 in some cases. In some examples, the light-section 40 of a first pixel frame 15 illuminates pixels 30 from another (second) pixel frame 15 (in addition to pixels from the first pixel frame 15).

Figure 3C:
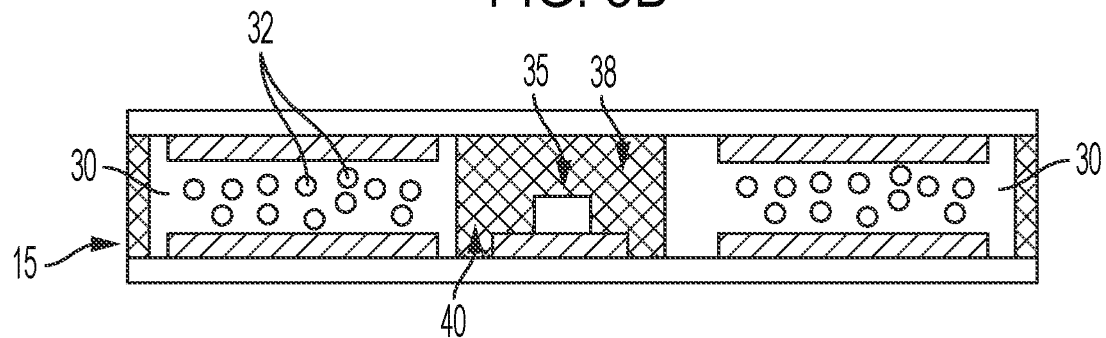

In one or more aspects, the light-section 40 is separated from a pixel 30 using a transparent sealing material 38. In one or more aspects, such as in FIG. 3C, the light-section 40 is filled with the transparent sealing material 38, and total internal reflection (TIR) can be used for emitted light 45 to reflect onto the pixel 30. The transparent sealing material 38 can be a polymer, elastomer, or any other suitable chemical or combination thereof For example, silver nanowires (AgNWs), conductive filler materials like carbon nanotubes (CNTs), single-wall carbon nanotubes (SWNTs), graphene, and ITO, or a combination of variants thereof can be used to form the transparent sealing material 38. In other aspects, silicon, epoxy, or PET with UV curable composition, photoinitiators or mold release material, or a combination thereof can also be used as a transparent sealing material 38. The transparent sealing material 38 facilitates the emitted light 45 to reach the reflective material 32 in the pixels 30, thereby making the content of the pixel 30 visible.

In one or more aspects, the light-section 40 includes a reflective layer 47, FIG. 3A. The reflective layer 47 is made of a material such as aluminum, titanium dioxide (TiO2), etc., that facilitates reflection of the emitted light 45 towards the pixel(s) 30 in the vicinity of the light-section 40.

Figure 4:
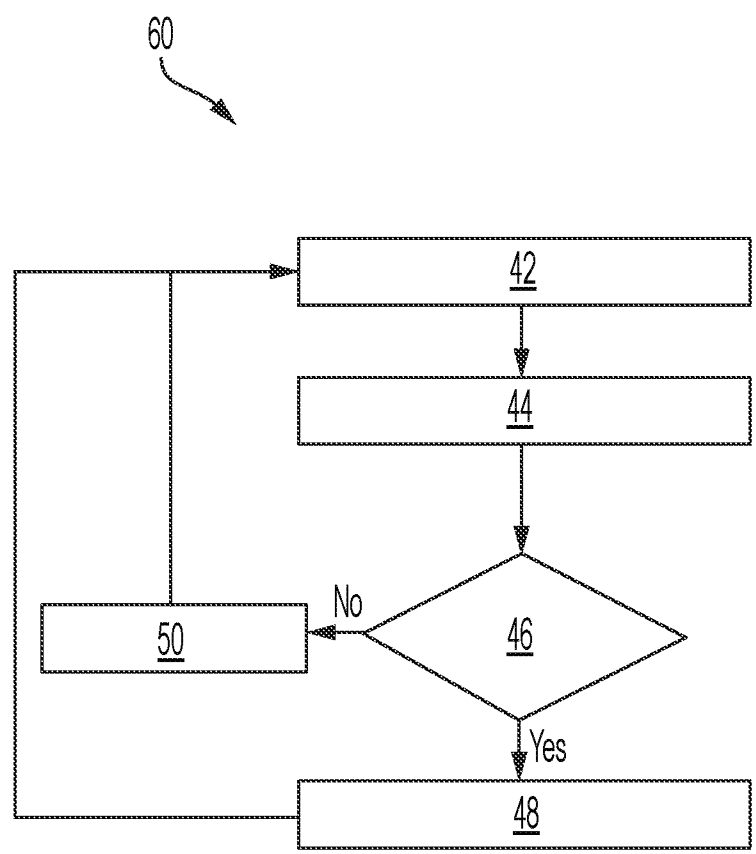
FIG. 4 depicts a flowchart of a method to display content to a user via a reflective display in low ambient light conditions according to one or more aspects.

FIG. 4 depicts a flowchart of a method 60 to display content to a user via a reflective display in low ambient light conditions according to one or more aspects. Method 60 includes displaying the desired content via the reflective display 100, at block 42. The content is displayed using the pixels 30 in pixel frame 15.

The method further 400 includes measuring the ambient light using the light sensor 39, at block 44. Further, at block 46, the measured ambient light is compared with a predetermined threshold (e.g., 500 lux, 100 lux, etc.). In one or more aspects, the light sensor 39 is pre-programmed/pre-configured so that it provides notification only when the ambient light is below the predetermined threshold.

If it is deemed that the ambient light is below (or equal to) the predetermined threshold, the microLED 35 is switched ON (i.e., provided electrical signal/power to emit light), at block 48. In one or more aspects, the amount of light 45 that is emitted by the microLED 35 is proportional to the ambient light that is measured. For example, the amount of electrical power supplied (e.g., amount of an electric current, a voltage applied, etc.) to the microLED 35 is proportional to the measured ambient light. In this way, the lesser the measured ambient light, the more the light 45 emitted by the microLED 35.

Alternatively, if it is deemed that the ambient light is above (or equal to) the predetermined threshold, the microLED 35 is switched OFF (i.e., stop emitting light), at block 52. In some aspects, the electrical power to the microLED 35 is stopped.

Figure 5:
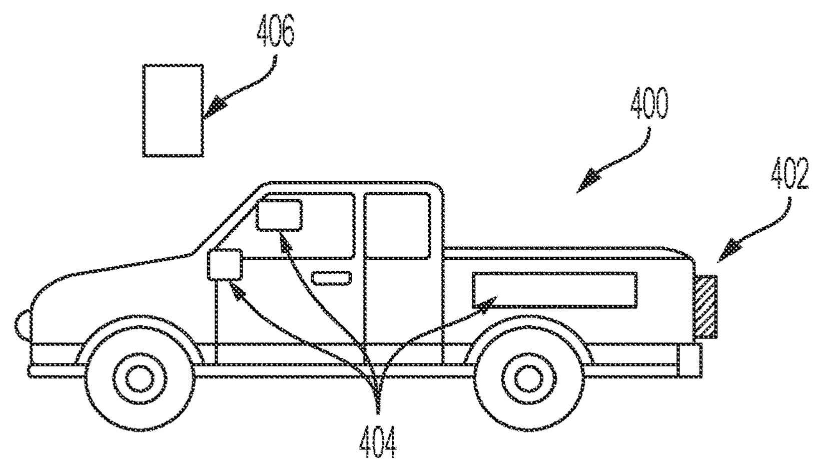
FIG. 5 shows an example view where the display panel is used as an exterior facing display in a vehicle.
Figure 6:
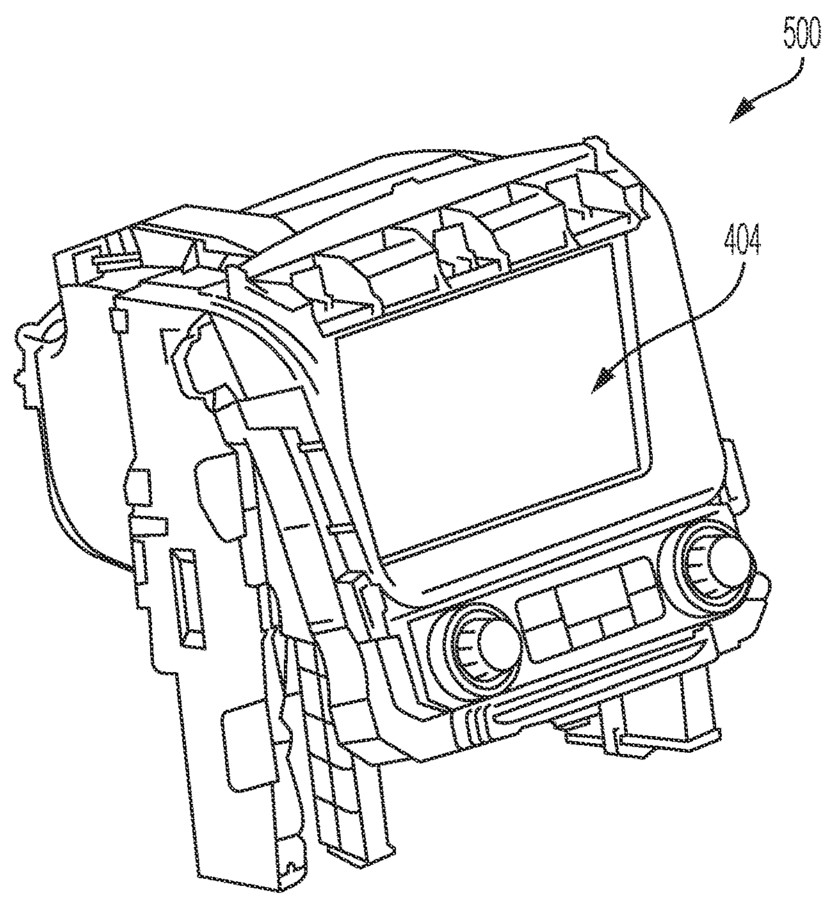
FIG. 6 depicts an example interior infotainment system with a display panel.

FIG. 5 depicts an example where the display panel is used as part of a vehicle 400. The display panel 100 can be used as part of a screen 404. The display panel 404 can be inside the vehicle or on the exterior of the vehicle, or both. The screen 404 can refer to multiple display panels 100 that the vehicle 400 is equipped with. Screen 404 renders information to one or more users, such as the occupants of vehicle 400. For example, screen 404 can be part of an infotainment system. FIG. 6 depicts an example infotainment system 500 that includes screen 404. Screen 404 of the infotainment system 500 can be used to display information such as radio channels, vehicle metrics (e.g., odometer, time, etc.), navigation data, games, video, clock, etc.

In addition, screen 404 displays the information captured by one or more sensors 402 equipped on the vehicle 400. For example, the sensors 402 can include radar, lidar, camera, ambient light sensor, or any other such sensor device. The data measured using the sensors 402 may be used to render information on the display panel 100. In one example, a camera captures a scene in the rear of vehicle 400, and the scene is rendered on screen 404. The screen 404, in this manner, can be used as part of a rearview assembly in lieu of (or in addition to) a rearview mirror. It is understood that scenes from other sides of the vehicle 400 can also be rendered in other examples. Alternatively, or in addition, the display panel 404 can be used to render information from other types of sensors 402 that are equipped on the vehicle 400. The screen communicates with the sensors 402 in a wired and/or wireless manner. Alternatively, or in addition, screen 404 can be used to mirror or render information from user equipment 406, such as a phone, a wearable, a laptop, a tablet computer, etc. In one or more examples, screen 404 can also be part of a separation screen between a front portion (e.g., driver's seat) and a rear portion (passenger's seat) of the vehicle 400. The screen may communicate with a user equipment 406 in a wireless and/or wired manner.

Figure 7:
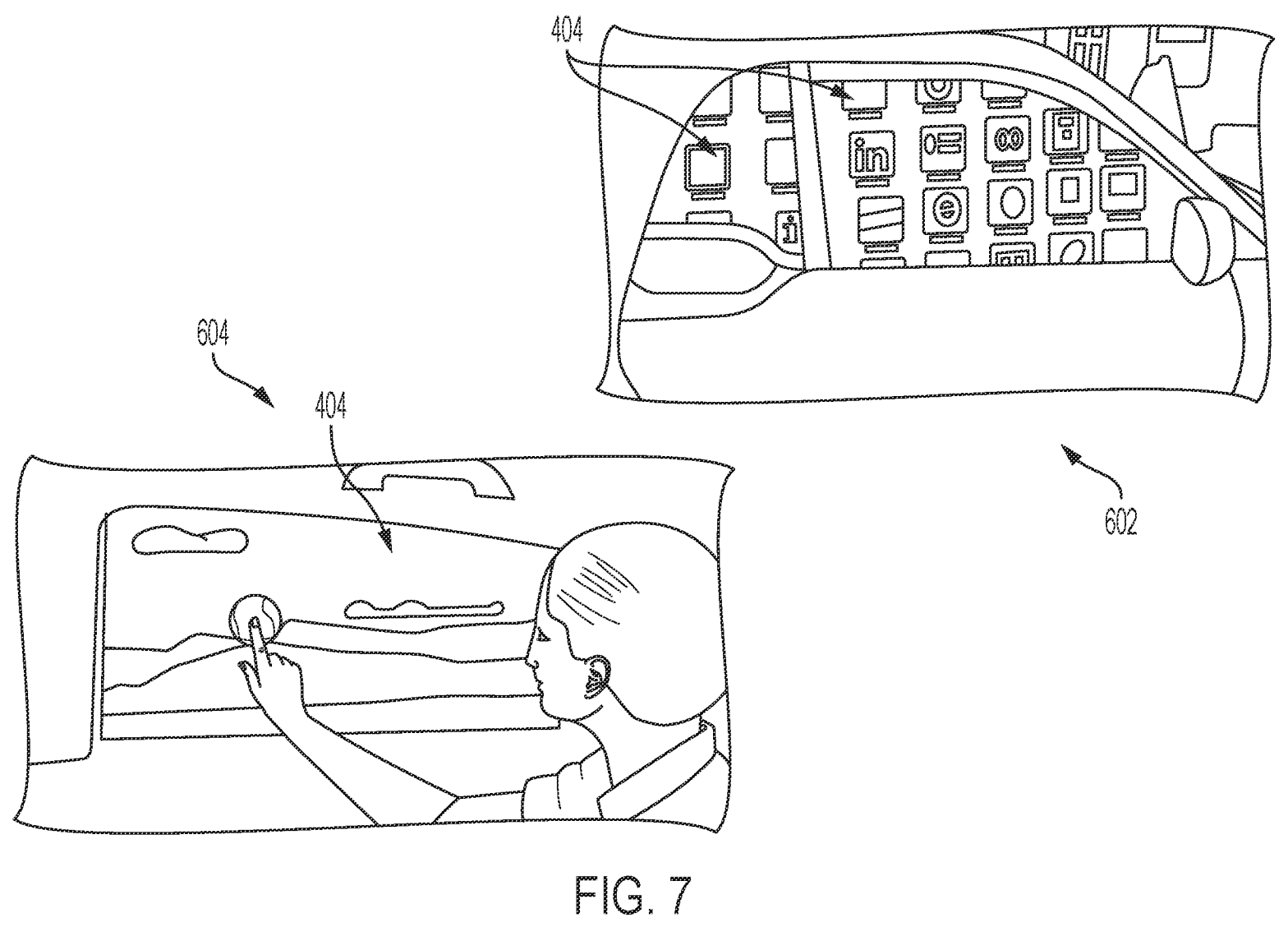

FIG. 7 shows an example view 602 where the display panel 404 is used as an exterior facing display in vehicle 400. Further, example view 604 shows the display panel 100 being used as an interior facing display 404 in vehicle 400.

It is understood that the vehicle 400 is exemplary and that the technical features described herein are applicable in other types of vehicles than the one depicted. Additionally, it is understood that the positions of the sensors 402 and the screen 404 are exemplary and that in other examples, the positions, shapes, sizes of such components can vary.

It is further understood that although some possible uses of the display panel 100 in a vehicle 400 are described herein, the display panel 100 is not limited to only such uses. The display panel 100 can be used in various other cases where a display device is required, such as wearables, phones, computers, televisions, monitors, appliances, or any other electronic device that includes and/or uses a display to render information to one or more users.

It should be noted that although the examples herein use a microLED 35 to emit light 45 in low ambient light conditions, in one or more aspects, other light sources can be used instead of a microLED 35 such as LED, miniLED, laser light sources, etc. Accordingly, the emitted light 45 is not to be construed to be from a microLED, but any light source that can be embedded in the light-section 40 on the same layer as the pixel 30 can be used in one or more aspects of the present technical solution.

It should be noted that although the examples display panel shown herein are of a particular shape such as rectangle, in other aspects, the display panel can have any other shape, such as circle, triangle, oval, square, etc.

Technical solutions described herein provide a device that provides a readable reflective display system under low environmental lighting conditions using microLED embedded into the display on the same layer as the electronic pigment material forming the pixels. By installing a reflective layer below the microLED or transmittance sealing material to secure the electric pigments on the designated area, the efficiency of the lighting system can be increased to reduce power consumption or decrease the number of micro LEDs to be installed. In some examples, lighting sensors are installed on the same layer as the microLED to control the light output from the microLEDs depending on environmental lighting conditions.

Technical solutions herein provide a microLED embedded reflective display device, including a first display substrate layer, a second display substrate layer, and electric pigments to display information on the reflective display. The display device further includes sealing material to secure the electric pigments on the designated area. The display device also includes one or more light sources located between the sealing material to illuminate the display in low environmental lighting conditions. The device also includes conductive material printed on the substrate to electrically control the electric pigments and light sources.

The device further includes reflective surfaces under the one or more light sources to effectively manage the emitted light from the light sources to reach the pigment material. Further, the device includes transparent sealing material to allow the emitted light from the light sources to reach the pigment material in the pixel. The device also includes a thin film transistor (TFT) layer that controls the display image (i.e., content) shown by the pixels. The TFT layer can also control the electric power supplied to the light sources to make the pixels visible in low light conditions. In some aspects, the device includes a light sensor that is embedded into the display to control the amount of emitted light from the light sources depending on environmental lighting conditions.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof Therefore, it is intended that the present disclosure not be limited to the particular embodiments disclosed but will include all embodiments falling within the scope thereof.

What is claimed is:

1. A reflective display device comprising:

a first substrate layer;

a second substrate layer spaced from the first substrate layer;

a layer of pigment material formed on one of the first substrate layer and the second substrate layer, wherein the layer of pigment material is divided into a plurality of pixels, the pigment material in each pixel displaying information by reflecting light;

a first transparent sealing member extending between the first substrate layer and the second substrate layer;

a second transparent sealing member extending between the first substrate layer and the second substrate layer spaced from the first transparent sealing member, wherein a first sidewall of the second transparent sealing member and the first transparent sealing member define a pixel chamber, and wherein a second sidewall of the second transparent sealing member and the first sidewall of the second transparent sealing member define a light chamber, one of the plurality of pixels being arranged in the pixel chamber;

a light sensor embedded in the layer of pigment material itself, the light sensor being arranged in the light chamber; and a light source embedded in the layer of pigment material itself in the light chamber adjacent the light sensor, wherein the light source emits light based on a measurement of ambient light from the light sensor, wherein emitted light from the light source is reflected by the pigment material, and wherein the light chamber comprises a layer of reflective material embedded under the light source that reflects light to one or more pixels of the plurality of pixels and is filled with the second transparent sealing member such that a total internal reflection (TIR) of emitted light from the light source is reflected onto the pixel chamber.

2. The reflective display device of claim 1, wherein the light source is a plurality of light sources.

3. The reflective display device of claim 1, wherein the light source is a microLED.

4. The reflective display device of claim 1, wherein the light source emits light in response to the light measurement being below a predetermined threshold.

5. The reflective display device of claim 1, further comprising the substrate layer supporting the layer of pigment material.

6. The reflective display device of claim 1, further comprising a fourth transparent sealing member extending between the first substrate layer and the second substrate layer spaced from the third transparent sealing member defining another pixel chamber, wherein the light chamber including the light source and the light sensor is located between the pixel chamber and the another pixel chamber in the layer of pigment material.

7. A method comprising:

determining, using a light sensor arranged in a light chamber defined between a first substrate, a second substrate, a first sidewall of a first transparent sealing member and a second sidewall of the first transparent sealing member, an amount of ambient light surrounding a reflective display panel; and based on determining that the amount of ambient light is below a predetermined threshold, causing a light source arranged in the light chamber adjacent the light sensor to emit light that is incident on a pigment material in a pixel of the reflective display panel arranged in a pixel chamber defined between the first substrate, the second substrate, a second transparent sealing member, and the first transparent sealing member by providing electric power to the light source, the light source and the light sensor embedded in the reflective display panel in the same layer as the pixel;

wherein the light chamber comprises a layer of reflective material embedded under the light source that reflects light to one or more pixels of the plurality of pixels and is filled with the first transparent sealing member such that a total internal reflection (TIR) of emitted light from the light source is reflected onto the pixel chamber.

8. The method of claim 7, wherein the light source is a microLED.

9. The method of claim 7, wherein the pigment material in the pixel displays information by reflecting light.

10. The method of claim 7, wherein the emitted light from the light source is proportional to the amount of ambient light.

11. A vehicle comprising:

a reflective display device comprising:

a first substrate layer;

a second substrate layer spaced from the first substrate layer;

a layer of pigment material formed on one of the first substrate layer and the second substrate layer, wherein the layer of pigment material is divided into a plurality of pixels, the pigment material in each pixel displaying information by reflecting light;

a first transparent sealing member extending between the first substrate layer and the second substrate layer;

a second transparent sealing member extending between the first substrate layer and the second substrate layer spaced from the first transparent sealing member, wherein a first sidewall of the second transparent sealing member and the first transparent sealing member define a pixel chamber, and wherein a second sidewall of the second transparent sealing member and the first sidewall of the second transparent sealing member define a light chamber, one of the plurality of pixels being arranged in the pixel chamber;

a light sensor embedded in the layer of pigment material itself, the light sensor being arranged in the light chamber; and a light source embedded in the layer of pigment material itself in the light chamber adjacent the light sensor, wherein the light source emits light based on a measurement of ambient light from the light sensor, wherein emitted light from the light source is reflected by the pigment material, and wherein the light chamber comprises a layer of reflective material embedded under the light source that reflects light to one or more pixels of the plurality of pixels and is filled with the first transparent sealing member such that a total internal reflection (TIR) of emitted light from the light source is reflected onto the pixel chamber.

12. The vehicle of claim 11, wherein the light source is a plurality of light sources.

13. The vehicle of claim 11, wherein the light source is a microLED.

* * * * *